Sept. 27, 1966　　　　W. J. SAGE　　　　3,274,760

DEMISTIFIER SCREEN AND SUPPORT THERFOR

Filed July 31, 1964

William J. Sage　　INVENTOR

BY

*Edwin M. Thomas*
ATTORNEY

3,274,760
DEMISTIFIER SCREEN AND SUPPORT THEREFOR

William J. Sage, Edmonton, Alberta, Canada, assignor to Esso Research and Engineering Company, a corporation of Delaware
Filed July 31, 1964, Ser. No. 386,587
5 Claims. (Cl. 55—491)

This invention relates to a screen and support therefor, particularly for a screen which is to be inserted in apparatus such as a demistifier used in the fractionation of petroleum products and the like.

In the prior art, it has been common practice to place a screen in a cylindrical distillation vessel or tower to remove liquid droplets or other undesirable materials contained in vapor streams passing therethrough. In conventional practice, so-called demister screens are provided for trapping mist or other fine liquid droplets and separating them from hydrocarbon vapor streams. The present invention relates to an improved apparatus for this purpose, although it is not limited to such specific purpose and may be used for separating liquid and even solid particles from gas and vapor streams in various types of installations wherever such screening and filtration are needed. The apparatus may be used also to separate solids from liquid streams.

In the past, supporting racks for mist eliminator screens have normally been fastened in place in the conventional cylindrical tower vessels by welding them in the desired location. Vessels of this type are relatively large and the screens are necessarily massive and bulky. Therefore, the installation of screens and supporting racks therefor in existing vessels has given rise to several difficulties in prior practice. Thus, when such racks are welded in place, the vessels must first be purged carefully and completely of hydrocarbon vapors. Otherwise there is great danger of fire and explosion, e.g., when the welding operation is started. Moreover, such vessels must normally be shut off from connections with other equipment and must be completely isolated from sources of hydrocarbon vapors and other combustible materials. This means that considerable time, and frequently considerable effort, must be expended before the screen or, more especially its supporting frame, can be installed. Furthermore, welding often cannot be carried out in vessels which, for example, have been heat treated for stress relieving, and the like, without introducing objectionable strains or stresses due to the welding operation itself.

It is, therefore, an object of the present invention to avoid the foregoing difficulties and to provide a relatively simple and easily installable supporting structure for screens of the general type mentioned above.

Preferably, the supporting means comprises primarily a split ring which can be tightened in place so as to firmly support a supporting frame. The frame or rack is designed so that it can readily be mounted on the split ring, regardless of the particular state of adjustment of the ring. More particularly, a ring is used which is split in one or preferably more than one place so that it can be expanded into firm frictional contact with the confining walls of the cylindrical enclosure wherein it is placed. Preferably the ring is made in two sections, but if desired it can be made in three sections or more. The facing ends of the ring structure are threaded oppositely for a short distance so as to accommodate a tightening nut or turnbuckle assembly at each break in the ring. A ring with a single discontinuity, that is one which is cut in only one place, may be used in some cases where the configuration allows its insertion into the vessel. With this arrangement it is necessary only to use a single turnbuckle to expand or contract the ring in fitting it into place or removing it from the vessel. Instead of a turnbuckle, a simple nut may be substituted which is threaded onto only one of the facing ends of the split ring device. In this case the nut may simply be placed rotatably or pivotally mounted on the other end so that the expansion movement of the ring with respect to the nut takes place only with one of the facing end elements. Preferably, for most conventional tower installations, the ring is made in at least two sections so that it can be inserted piecemeal and then assembled inside the tower. More sections may be employed if desired, but they tend to make it difficult to maintain alignment during tightening. It is possible, also, to hinge the ring between two sections and use only a single turnbuckle or nut for expanding and contracting a two-piece ring. Generally the arrangement described below with two turnbuckles is preferable.

Once the ring, i.e., in all its parts, is placed in the vessel, the free ends of the sections are joined. In some cases they may be joined before placing in the vessel where access is obtainable. In assembly, the ring ends are interconnected with the expansion collar or turnbuckle to form the necessary continuous ring structure. Thereafter the ring may be raised or lowered to the required location, or otherwise adjusted in place, and the expanding nut or nuts, or turnbuckles, are then tightened to bring the ring segments or sections into firm retaining position against the wall structure. For example, in installing in a large tower provided with suitable manholes which are much smaller than the ring, the ring will be inserted in sections which are thereafter connected together with the expanding nuts or turnbuckles. These are thereafter tightened, when the ring has been adjusted at the precise location desired. It will be understood that the same general procedure may be used to install a screen support in a horizontal or sloping vessel as in a vertical tower.

The ring is provided, around its periphery, with a plurality of spaced positioning means which are adapted to receive and accurately position the transverse reinforcing elements which comprise the framework or rack. The latter support the screen proper. These transverse elements may be bars of metal, provided with elongated holes on each end. The holes are adapted as more fully described below to fit over the positioning means. The latter, in the embodiment illustrated, are formed as upstanding dowels or pins which are welded or otherwise secured to the ring structure. After the ring is tightened in place and all the supporting bars are in place on their pins, the screen itself is placed on the supporting bars, to which it can be lashed in conventional manner. Alternatively, it may be locked on the rack by placing a second set of bars on its opposite side. Such second set of bars may also be positioned over the pins or dowels and secured in place by putting cotter pins through the dowels. With this arrangement, the screen cannot be dislodged by reverse surges of the fluid passing through.

The structure of this invention has the following advantages:

(1) It makes is possible to place a screen, particularly a demistifier screen, in a vessel without welding inside the vessel.

(2) A purging of the vessel, normally required to eliminate fire hazards, is not required. In case there are residual hydrocarbon vapors present, the operating personnel can wear masks for the short period of time required for installation. Installation usually can be done very quickly.

(3) The screen may be placed between two similar rings, if desired, with full or partial sets of bars on each, if it is felt that there is particular danger of the screen becoming dislodged during operation.

(4) Alternatively, by making the dowels or pins of proper length and arrangement, a single ring can support a screen together with necessary supporting bars, both above and below it. This is a preferred arrangement for many installations.

(5) The supporting ring or rings may be installed either from above or from below the desired location for the screen by properly orienting the ring sections and the locator pins.

(6) In case a demistifier screen is no longer required in a vessel, the entire assembly, including the rings, can easily and quickly be removed without the necessity of using cutting torches and the like inside the vessel.

(7) In case the screen is first positioned incorrectly, or in case a need arises to change its location for any reason, the screen may be repositioned very easily. This repositioning operation can be done without removing the demistifier screen from the tower.

The invention will be more fully understood by detailed reference to the drawings and a description of a preferred embodiment. In the drawings.

Figure 1:
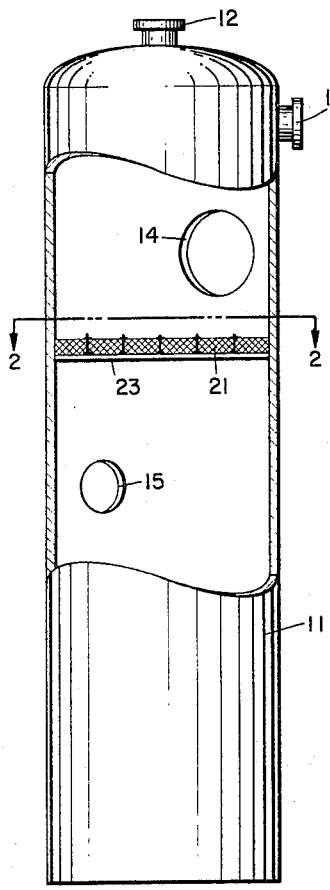
FIGURE 1 is a small scale elevational view showing the location of a demistifier screen in a tower.

Referring in further detail to FIGURE 1, there is shown a tower 11 of conventional type with fittings 12 and 13 which are also conventional, and provided with a manhole 14 and an armhole 15. The latter may be of any size or location, such being widely used in numerous types of towers. As indicated at 21, a screen is installed transversely of the tower to remove extraneous material from the fluid stream passing through the tower. When the screen is to be used for filtering, as distinguished from demisting, the screen may be of very fine mesh metal, woven fabric matting materials of various kinds, with or without filter-aid materials to assist in removing the undesirable extraneous material passing through the system. As previously suggested, screens of this type have large areas and must be substantially reinforced or supported by adequate transverse supporting means. In FIGURE 1 these are indicated only generally at 23.

Figure 2:
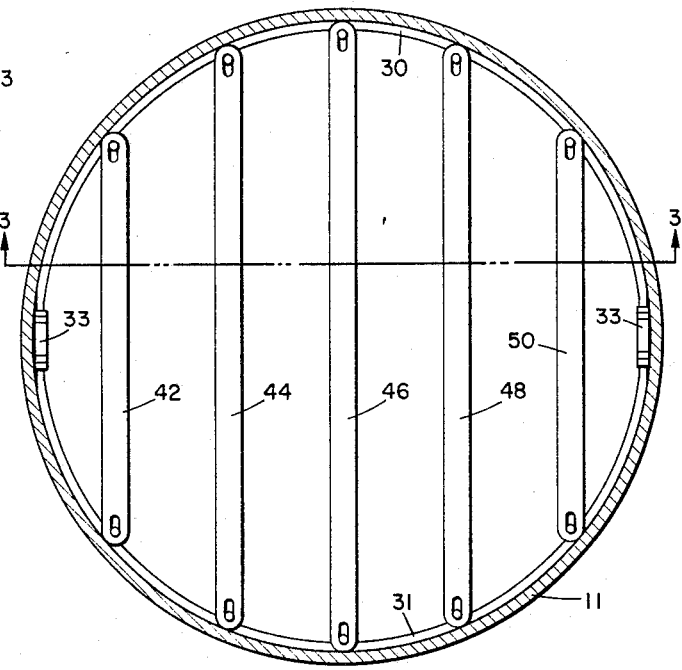
FIGURE 2 is a sectional view looking down on the screen support, taken substantially along the line 2—2 of FIGURE 1, and showing the lower supporting bars without a screen.

Turning to FIGURE 2, there is shown on a larger scale a tower or vessel 11 similar to that of FIGURE 1, within which the split ring structure 30, 31, is inserted. This consists of two half rings or semicircles of suitable structure, such as round steel bars which have their respective ends threaded with right and left-hand threads. When the two half-circle ring elements are positioned opposite each other they may be joined by turnbuckles 33. If desired, these may be put on the rings before bringing into the tower, but ordinarily such materials are assembled through a manhole too small for the complete ring.

Figure 4:
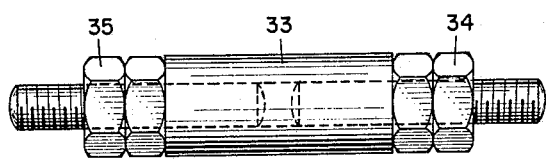
FIGURE 4 is an enlarged detail of one of the turnbuckle type adjustments preferred for forcing the ring into expanded position.

FIGURE 4 shows an enlarged section of the nut or turnbuckle 33 which is provided preferably with lock nuts 34 and 35 to secure it in adjusted position.

At spaced intervals around the split ring sections there are welded dowels or rod elements 41. See FIGURE 6. These are arranged preferably in parallel with the axis of the cylinder, that is, transversely to the plane of the screen. In assemblying a number of transverse bars 42, 44, 46, 48, 50, are simply set on the ring by inserting the pins 41 through elongated openings 51 in the bars.

Figure 3:
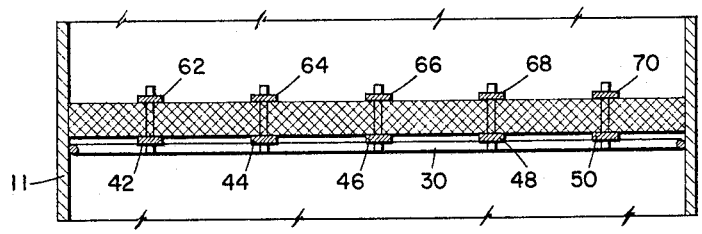
FIGURE 3 is a transverse sectional view taken substantially along the line 3—3 of FIGURE 2.
Figure 5:
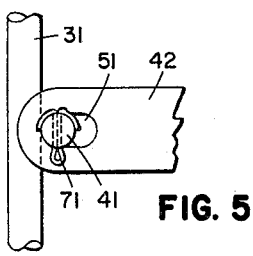
FIGURE 5 is an enlarged detail view showing the relationship between the transverse supporting bars and the ring, with two locator dowel pins.
Figure 6:
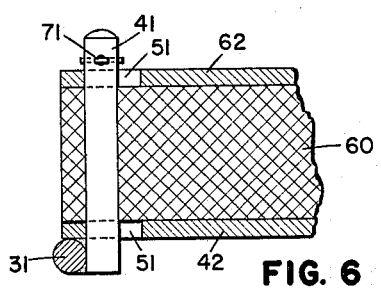
FIGURE 6 is a fragmentary vertical elevation with certain parts in section corresponding to FIGURE 5, showing on an enlarged scale the arrangement of the locator pins or dowels with respect to the ring, the screen, and the supporting or reinforcing bars.

In FIGURES 5 and 6 a typical bar 42 is shown with the elongated opening 51 receiving the pin 41. The screen or filter body 60 is placed on the supporting bars 42, 44 etc., after they are all in place. For many installations no further fastening is necessary; however, in case there is a reversal of flow or surging of any kind within the tower, it is frequently desirable to fix the screen in place so that it cannot be dislodged from its proper position. In this case any series of bars 62, 64, 66, 68 and 70 may be placed over the screen as indicated best in FIGURE 3. For further security, cotter pins or equivalent fasteners 71 may be passed through the dowels 41 above the locking bars 62, 64, etc., as best shown in FIGURE 6.

It will be obvious that the structure may be modified in many ways without departing from the spirit and purpose of the invention. Mist eliminator racks and screens installed as described above have been used successfully in natural gasoline plants with excellent results. During subsequent plant inspections and turn-arounds, the screens have been found properly in place but readily removable when removal is desirable.

It will be understood that those skilled in the art may make numerous variations and substitutions, and it is intended by the claims which follow to cover such as fully as the prior art properly permits.

What is claimed is:

1. A self-supporting screen structure for use internally within a cylindrical vessel through which a fluid flows comprising, in combination, an annular member defining a plane and having at least one interruption therein to provide spaced facing end elements, means for adjusting the spacing between said end elements to thereby expand the outside diameter of said annular member into frictional engagement with the interior walls of said vessels, a plurality of upstanding rod elements having one end secured to an inner portion of said annular member, said rod element extending in a direction perpendicular to the plane of said annular member, a plurality of individual and varying length transverse bar elements extending substantially parallel to one another, having end portions engaging said rod elements, at least one end portion of each bar element having a slot which slidably engages an associated rod element, each said slot being elongated along the lengthwise axis of said bar elements for permitting free relative movement between said rod elements and annular member as said annular member is expanded into contact with said cylindrical vessel, and previous screen means adapted to extend transversely completely across said cylindrical vessel and to overlie said bar elements, and means for securing said screen means to said bar elements.

2. Apparatus according to claim 1 wherein said securing means includes a second plurality of individual and varying length transverse bar elements extending substantially parallel to one another having end portions engaging said rod elements, at least one end of each bar element having a slot which slidably engages an associated rod element, each said slot being elongated along the lengthwise axis of said bar elements.

3. Apparatus according to claim 2 wherein the periphery of said screen means includes apertures engaging said rod elements.

4. Apparatus according to claim 2 wherein said annular member is circular in cross-section and said end elements include threaded portions.

5. A self-supporting screen structure for use internally within a cylindrical vessel through which a fluid flows comprising, in combination, an annular member defining a plane having at least one interruption therein to provide spaced facing end elements, means for adjusting the spacing between said end elements to thereby expand the outside diameter of said annular member into frictional engagement with the interior walls of said vessel, a plurality of upstanding rod elements having one end secured to an inner portion of said annular member, said rod elements extending in a direction perpendicular to the plane of said annular member, a first plurality of individual and varying length transverse bar elements extending substantially parallel to one another having end portions engaging said rod elements, each end portion of each bar element having a slot which slidably engages an associated rod element, each said slot being elongated along the lengthwise axis of said bar elements for permitting free relative movement between said rod elements and annular member as said annular member is expanded into contact with said cylindrical vessel, previous screen means adapted to extend transversely completely across said cylindrical vessel and overlying said bar elements, a second plurality of individual and varying length transverse bar elements overlying said screen means and extending substantially parallel to one another having end portions engaging said rod elements, each end of each bar element having a slot which slidably engages an associated rod element, each said slot being elongated along the lengthwise axis of said bar elements, and means for securing said second bar elements to said rod elements.

References Cited by the Examiner

UNITED STATES PATENTS

| | | | |
|---|---|---|---|
| 645,810 | 3/1900 | Hennessy. | |
| 1,535,819 | 4/1925 | Emmet | 55—493 |
| 1,728,140 | 9/1929 | Steuer | 55—519 |
| 1,820,216 | 8/1931 | Ferris | 287—60 |
| 2,681,218 | 6/1954 | Donovan | 261—114 |
| 2,889,018 | 6/1959 | Swan | 220—22 |
| 2,925,878 | 2/1960 | Spann | 55—185 |

HARRY B. THORNTON, *Primary Examiner.*

B. NOZICK, *Assistant Examiner.*